United States Patent
Saiki et al.

(10) Patent No.: US 10,688,701 B2
(45) Date of Patent: Jun. 23, 2020

(54) TRANSFER SHEET, METHOD FOR PRODUCING TRANSFER SHEET, OPTICAL LAMINATE, AND METHOD FOR PRODUCING OPTICAL LAMINATE

(71) Applicant: FUJIFILM Corporation, Tokyo (JP)

(72) Inventors: Yuki Saiki, Minamiashigara (JP);
Akihiro Anzai, Minamiashigara (JP);
Shunya Katoh, Minamiashigara (JP);
Hiroshi Inada, Minamiashigara (JP);
Kazuhiro Oki, Minamiashigara (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 16/107,045

(22) Filed: Aug. 21, 2018

(65) Prior Publication Data

US 2018/0370099 A1 Dec. 27, 2018

Related U.S. Application Data

(63) Continuation of application No. PCT/JP2017/004386, filed on Feb. 7, 2017.

(30) Foreign Application Priority Data

Mar. 8, 2016 (JP) .................. 2016-044646

(51) Int. Cl.
| | | |
|---|---|---|
| *B32B 27/18* | (2006.01) | |
| *B32B 27/26* | (2006.01) | |
| *B32B 27/08* | (2006.01) | |
| *B32B 27/30* | (2006.01) | |
| *C08F 20/00* | (2006.01) | |
| *G02B 5/00* | (2006.01) | |
| *G02B 5/30* | (2006.01) | |
| *B29C 45/16* | (2006.01) | |
| *G02F 1/13363* | (2006.01) | |
| *C09D 4/00* | (2006.01) | |
| *C08F 222/10* | (2006.01) | |
| *B29K 69/00* | (2006.01) | |
| *B29K 105/00* | (2006.01) | |
| *B29K 667/00* | (2006.01) | |
| *B29L 11/00* | (2006.01) | |

(52) U.S. Cl.
CPC .......... *B29C 45/1679* (2013.01); *B32B 27/08* (2013.01); *B32B 27/18* (2013.01); *B32B 27/26* (2013.01); *B32B 27/30* (2013.01); *B32B 27/306* (2013.01); *B32B 27/308* (2013.01); *C08F 222/10* (2013.01); *C09D 4/00* (2013.01); *G02B 5/00* (2013.01); *G02B 5/30* (2013.01); *G02F 1/13363* (2013.01); *B29K 2069/00* (2013.01); *B29K 2105/0079* (2013.01); *B29K 2667/003* (2013.01); *B29L 2011/00* (2013.01); *B32B 2255/10* (2013.01); *B32B 2255/26* (2013.01); *B32B 2270/00* (2013.01); *B32B 2307/31* (2013.01); *B32B 2307/40* (2013.01); *B32B 2307/732* (2013.01); *B32B 2457/00* (2013.01); *B32B 2457/20* (2013.01)

(58) Field of Classification Search
None
See application file for complete search history.

(56) References Cited

U.S. PATENT DOCUMENTS

| | | | |
|---|---|---|---|
| 2009/0272950 A1* | 11/2009 | Lu .............................. | C09J 4/00 252/585 |
| 2016/0214285 A1* | 7/2016 | Taguchi .................. | B29C 43/18 |

FOREIGN PATENT DOCUMENTS

| | | |
|---|---|---|
| JP | 1-308475 A | 12/1989 |
| JP | 2005-288780 A | 10/2005 |
| JP | 2006-15498 A | 1/2006 |
| JP | 2010-509439 A | 3/2010 |
| JP | 2010-275373 A | 12/2010 |
| JP | 2013-39767 A | 2/2013 |
| JP | 2013-158970 A | 8/2013 |
| JP | 2016-16538 A | 2/2016 |
| WO | WO 2015/016297 A1 | 2/2015 |
| WO | WO 2015/050256 A1 | 4/2015 |
| WO | WO 2015/098549 A1 | 7/2015 |

OTHER PUBLICATIONS

International Preliminary Report on Patentability and Written Opinion of the International Searching Authority (forms PCT/IB/373, PCT/ISA/237 and PCT/IB/326), dated Sep. 20, 2018, for corresponding International Application No. PCT/JP2017/004386, with Written Opinion translation.
International Search Report (form PCT/ISA/210), dated Apr. 25, 2017, for corresponding International Application No. PCT/JP2017/004386, with an English translation.
Japanese Office Action, dated Feb. 12, 2019, for corresponding Japanese Application No. 2016-044646, with an English translation.
Extended European Search Report for European Application No. 17762786.6, dated Jan. 4, 2019.
Office Action dated Mar. 23, 2020 in corresponding Chinese Patent Application No. 201780012925.X, with English translation.

* cited by examiner

*Primary Examiner* — Sheeba Ahmed
(74) *Attorney, Agent, or Firm* — Birch, Stewart, Kolasch & Birch, LLP

(57) ABSTRACT

A transfer sheet includes a cured liquid crystal composition layer, a block layer including a (meth)acrylic polymer, and a thermoplastic welded layer in this order, the thermoplastic welded layer and the block layer are in direct contact with each other, and the thermoplastic welded layer includes a thermoplastic resin and an ultraviolet curable resin.

11 Claims, No Drawings

US 10,688,701 B2

TRANSFER SHEET, METHOD FOR PRODUCING TRANSFER SHEET, OPTICAL LAMINATE, AND METHOD FOR PRODUCING OPTICAL LAMINATE

CROSS-REFERENCE TO RELATED APPLICATIONS

This application is a Continuation of PCT International Application No. PCT/JP2017/4386, filed on Feb. 7, 2017, which claims priority under 35 U.S.C. § 119(a) to Japanese Patent Application No. 2016-044646, filed on Mar. 8, 2016. Each of the above application(s) is hereby expressly incorporated by reference, in its entirety, into the present application.

BACKGROUND OF THE INVENTION

1. Field of the Invention

The present invention relates to a transfer sheet for transferring a cured liquid crystal composition layer. The present invention also relates to an optical laminate including a cured liquid crystal composition layer. The present invention further relates to a method for producing the transfer sheet and a method for producing the optical laminate.

2. Description of the Related Art

Molded articles having various optical properties such as a phase difference film and a reflection film can be prepared by using a liquid crystal composition including a liquid crystal compound. As a method of preparing a molded article including a layer formed by curing a liquid crystal composition (in the present specification, sometimes referred to as "cured liquid crystal composition layer" or "liquid crystal layer"), a method using heat sealing by a thermoplastic welded layer as a thermoplastic adhesive layer, which is generally performed for bonding or molding of a resin film, may be used. However, in a method of transferring a liquid crystal layer using heat sealing in WO2015/050256, a problem that optical properties are not exhibited as designed has been pointed out. Further, in WO2015/050256, it has been found that this problem is derived from elution of an uncured material in the liquid crystal layer into the thermoplastic adhesive layer by heating or pressurization, and means for preventing this elution has been proposed.

SUMMARY OF THE INVENTION

In the view of the cause and problem described in WO2015/050256, the present inventors have conceived that in a case of transferring various liquid crystal layers using heat sealing, a block layer for preventing substances from moving between a thermoplastic welded layer and a liquid crystal layer is provided between both layers. In a case of producing a molded article using an acrylate polymer for the block layer, the present inventors have confronted with a new problem of an example in which adhesiveness between the layers is not insufficient.

The present invention relates to a transfer sheet which is provided for transferring a liquid crystal layer using a thermoplastic welded layer and has optical properties as designed in the liquid crystal layer. Further, the present invention relates to a transfer sheet which exhibits high adhesiveness between respective layers and good adhesiveness to a base material. The present invention also relates to an optical laminate including a liquid crystal layer and a thermoplastic welded layer, which exhibits high adhesiveness between respective layers.

The present inventors have conducted intensive investigations for improving adhesiveness between a thermoplastic welded layer and a liquid crystal layer in a transfer sheet provided with a block layer between the thermoplastic welded layer and the liquid crystal layer. As a result, it is found that it is possible to improve adhesiveness between the thermoplastic welded layer and the block layer by incorporating an ultraviolet curable resin into the thermoplastic welded layer.

That is, the present invention is to provide the following [1] to [11].

[1] A transfer sheet comprising, in order:
a cured liquid crystal composition layer;
a block layer; and
a thermoplastic welded layer,
in which the block layer includes a (meth)acrylic polymer,
the thermoplastic welded layer and the block layer are in direct contact with each other, and
the thermoplastic welded layer includes a thermoplastic resin and an ultraviolet curable resin.

[2] The transfer sheet according to [1], in which a content of the ultraviolet curable resin in the thermoplastic welded layer is 100% by mass or less with respect to a mass of the thermoplastic resin.

[3] The transfer sheet according to [1] or [2], in which the ultraviolet curable resin and the (meth)acrylic polymer included in the block layer are the same (meth)acrylate polymer.

[4] The transfer sheet according to any one of [1] to [3], in which a film thickness of the thermoplastic welded layer is 0.5 μm to 30 μm.

[5] The transfer sheet according to any one of [1] to [4], in which the thermoplastic welded layer includes an ultraviolet curable monomer, and
a content of the ultraviolet curable monomer is 50% by mass or less with respect to a total mass of the ultraviolet curable resin and the ultraviolet curable monomer.

[6] The transfer sheet according to [5], in which the content of the ultraviolet curable monomer is 20% by mass or less with respect to the total mass of the ultraviolet curable resin and the ultraviolet curable monomer.

[7] An optical laminate comprising:
the transfer sheet according to any one of [1] to [6]; and
a base material,
in which the base material and the thermoplastic welded layer are in direct contact with each other.

[8] The optical laminate according to [7], in which the base material includes polycarbonate.

[9] A method for producing an optical laminate comprising:
forming a base material on a surface of the thermoplastic welded layer of the transfer sheet according to any one of [1] to [6] under a heating condition,
in which the optical laminate includes the cured liquid crystal composition layer, the block layer, the thermoplastic welded layer, and the base material in this order.

[10] The method for producing an optical laminate according to [9], further comprising:
applying a composition including a thermoplastic resin and an ultraviolet curable monomer to a surface of the block layer of a material including the cured liquid crystal composition layer and the block layer; and irradiating a coating layer obtained after the applying of the composition with ultraviolet rays.

[11] A method for producing the transfer sheet according to any one of [1] to [6] comprising:

forming a thermoplastic welded layer including a thermoplastic resin and an ultraviolet curable monomer on a surface of the block layer of a material including the cured liquid crystal composition layer and the block layer; and irradiating the thermoplastic welded layer with ultraviolet rays.

According to the present invention, there is provided a transfer sheet which is provided for transferring a liquid crystal layer using a thermoplastic welded layer and has optical properties as designed in the liquid crystal layer. Also provided is a transfer sheet which exhibits high adhesiveness between respective layers and good adhesiveness to a base material. It is possible to provide an optical laminate which exhibits high adhesiveness between respective layers as an optical laminate including a liquid crystal layer and a thermoplastic welded layer using the transfer sheet of the present invention. The present invention further provides a method for producing the transfer sheet and a method for producing the optical laminate.

DESCRIPTION OF THE PREFERRED EMBODIMENTS

Hereinafter, the present invention will be described in detail.

The numerical range represented by the term "to" in the present specification include the numerical values set forth before and after "to" as lower and upper limits, respectively.

In the present specification, the term "(meth)acrylate" denotes "either or both of acrylate and methacrylate". The same is applied to the term "(meth)acrylic polymer" and the like.

<Transfer Sheet>

In the present specification, a transfer sheet means a sheet for transferring a liquid crystal layer to a base material using heat sealing by a thermoplastic welded layer. Heat sealing means achieving bonding using a thermoplastic substance dissolved by heating and is also called thermal welding. For heat sealing, as described later, bonding may be achieved by a step including heating and pressurization. The base material will be described later.

A transfer sheet of the present invention includes a liquid crystal layer, a block layer, and a thermoplastic welded layer. In one aspect, the transfer sheet may include other layers such as a support, an alignment layer, and a protective layer. In the transfer sheet of the present invention, the thermoplastic welded layer and the block layer are in direct contact with each other. Although the liquid crystal layer and the block layer are in direct contact with each other, another layer may be provided between the layers. However, it is preferable that the liquid crystal layer and the block layer are in direct contact with each other.

[Thermoplastic Welded Layer]

The thermoplastic welded layer means a layer to be bonded to the base material by dissolution by heating and then cooling. By bonding the thermoplastic welded layer to the base material, at least the liquid crystal layer, block layer, and thermoplastic welded layer of the transfer sheet of the present invention are integrated with the base material.

The temperature at which the thermoplastic welded layer dissolves is not particularly limited. However, for example, the temperature is preferably 80° C. to 150° C. and more preferably 100° C. to 130° C. The cooling is preferably performed at a cooling temperature equal to or lower than room temperature and more preferably performed at 10° C. to 30° C. Before the cooling, pressurization is preferably performed. Further, at the time of cooling, the pressurized state is preferably maintained. The pressurization may be performed at 0.01 MPa to 1.0 MPa, preferably 0.05 MPa to 0.5 MPa, and more preferably 0.1 MPa to 0.3 MPa.

Although the film thickness of the thermoplastic welded layer in the transfer sheet is not particularly limited, the film thickness is preferably 0.5 µm to 30 µm, more preferably 1 to 15 µm, and even more preferably 1 µm to 5 µm. By setting the film thickness of the thermoplastic welded layer to 0.5 µm or more, sufficient adhesiveness to the base material is reliably obtained.

The thermoplastic welded layer in the transfer sheet includes a thermoplastic resin and an ultraviolet curable resin. In one aspect, it has been found that by adding an ultraviolet curable monomer to the thermoplastic welded layer provided on a surface of the block layer and irradiating the thermoplastic welded layer with ultraviolet rays, adhesiveness between the block layer and the thermoplastic welded layer is improved. It is considered that the ultraviolet curable resin includes a composition obtained by polymerizing or polymerizing and crosslinking the ultraviolet curable monomer by ultraviolet irradiation and in the aspect, the polymerization at an interface in the thermoplastic welded layer on the block layer side contributes to improving adhesiveness.

In the thermoplastic welded layer, the content of the ultraviolet curable resin is preferably 100% by mass or less, more preferably 30% by mass to 100% by mass, and even more preferably 40% by mass to 100% by mass with respect to the mass of the thermoplastic resin.

The thermoplastic welded layer in the transfer sheet may include, in addition to the ultraviolet curable resin, an ultraviolet curable monomer as a raw material thereof. In a case where the thermoplastic welded layer includes the ultraviolet curable monomer, the content of the ultraviolet curable monomer with respect to the total mass of the ultraviolet curable resin and the ultraviolet curable monomer in the thermoplastic welded layer is preferably 50% by mass or less and more preferably 20% by mass or less. By setting the amount of the ultraviolet curable monomer to a predetermined amount or less, the ultraviolet curable monomer of the thermoplastic welded layer in the transfer sheet can be prevented from affecting close attachment to the base material.

The thermoplastic welded layer can be formed by applying a composition for forming a thermoplastic welded layer to a surface of the block layer, a release sheet, or the like, and irradiating this coating layer with ultraviolet rays. The composition for forming a thermoplastic welded layer includes a thermoplastic resin and an ultraviolet curable monomer. The content of the ultraviolet curable monomer in the composition for forming a thermoplastic welded layer is preferably 100% by mass or less, more preferably 30% by mass to 100% by mass, and even more preferably 40% by mass to 100% by mass with respect to the total mass of the thermoplastic resin. Similarly, the content of the ultraviolet curable monomer in the thermoplastic welded layer before being subjected to ultraviolet irradiation, which is provided on the surface of the block layer, is preferably 100% by mass or less, more preferably 30% by mass to 100% by mass, and even more preferably 40% by mass to 100% mass with respect to the total mass of the thermoplastic resin.

The composition for forming a thermoplastic welded layer may include components other than the thermoplastic resin and the ultraviolet curable monomer, such as a polymerization initiator. In addition, the composition may include a solvent.

(Thermoplastic Resin)

The thermoplastic welded layer includes a thermoplastic resin. Examples of the thermoplastic resin include vinyl chloride resins, vinyl acetate resins, vinyl chloride-vinyl acetate resins, ethylene-vinyl acetate resins, isobutene-maleic anhydride resins, acrylic resins, acrylic copolymer resins, styrene-butadiene resins, urethane resins, polyester resins, epoxy resins, silicone resins, modified silicone resins, rosin resins, polyvinyl acetal resins, chloroprene rubber, nitrile rubber, and nitrile resins. A mixture of two or more resins selected from these resins may also be used.

(Ultraviolet Curable Monomer)

Examples of the ultraviolet curable monomer include a monomer having a polymerizable unsaturated group such as a (meth)acryloyl group, a vinyl group, a styryl group, and an allyl group. Among these, a (meth)acrylate having a (meth)acryloyl group is preferable.

Particularly preferable examples of (meth)acrylate include a urethane (meth)acrylate monomer.

As the urethane (meth)acrylate monomer, a urethane (meth)acrylate monomer including a urethane bonding represented by Formula (II) and two or more (meth)acryloyl groups is preferable.

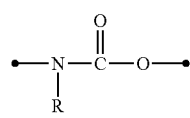

(II)

In Formula (II), R represents a hydrogen atom or a hydrocarbon group.

In the present specification, the term "hydrocarbon group" means a monovalent group constituted of only a carbon atom and a hydrogen atom, and examples thereof include aromatic ring groups such as an alkyl group, a cycloalkyl group, a phenyl group, and a naphthyl group. Examples of the alkyl group include a methyl group and an ethyl group. Examples of the cycloalkyl group include a cyclopentyl group, and a cyclohexyl group.

R is preferably a hydrogen atom.

The urethane (meth)acrylate monomer is a compound obtained through an addition reaction using a polyisocyanate compound and a hydroxyl group-containing (meth)acrylate compound or an addition reaction using a polyalcohol compound and an isocyanate group-containing (meth)acrylate compound.

Typically, the urethane (meth)acrylate monomer does not have an isocyanate group.

The polyisocyanate compound is preferably a diisocyanate or triisocyanate. Specific examples of the polyisocyanate compound include toluene diisocyanate, isophorone diisocyanate, hexamethylene diisocyanate, tolylene diisocyanate, and 1,3-bis(isocyanatomethyl)cyclohexane.

Examples of the hydroxyl group-containing (meth)acrylate compound include pentaerythritol triacrylate, dipentaerythritol pentaacrylate, 2-hydroxyethyl acrylate, and 2-hydroxyethyl methacrylate.

Examples of the polyalcohol compound include ethylene glycol, propylene glycol, glycerol, pentaerythritol, dipentaerythritol, trimethylolethane, and trimethylol propane.

Examples of the isocyanate group-containing (meth)acrylate compound include 2-isocyanatoethyl acrylate and 2-isocyanatoethyl methacrylate.

The urethane (meth)acrylate monomer includes three or more (meth)acryloyl groups, preferably includes four or more (meth)acryloyl groups, and more preferably include five or more (meth)acryloyl groups. The upper limit is not particularly limited and the number of (meth)acryloyl groups may be 30 or less and is more preferably 20 or less and even more preferably 18 or less.

The molecular weight of the urethane (meth)acrylate monomer is preferably 400 to 8,000 and more preferably 500 to 5,000.

A commercially available product may be used as the urethane (meth)acrylate monomer. Examples of commercially available products thereof include U-2PPA, U-4HA, U-6LPA, U-10PA, UA-1100H, U-10HA, U-15HA, UA-53H, UA-33H, U-200PA, UA-160TM, UA-290TM, UA-4200, UA-4400, UA-122P, UA-7100, and UA-W2A manufactured by Shin-Nakamura Chemical Co., Ltd., UA-510H, AH-600, AT-600, U-306T, UA-306I, UA-306H, UF-8001G, and DAUA-167 manufactured by KYOEISHA CHEMICAL Co., LTD., and EBERCRYL204, EBERCRYL205, EBERCRYL210, EBERCRYL215, EBERCRYL220, EBERCRYL230, EBERCRYL244, EBERCRYL245, EBERCRYL264, EBERCRYL265, EBERCRYL270, EBERCRYL280/15IB, EBERCRYL284, EBERCRYL285, EBERCRYL294/25HD, EBERCRYL1259, EBERCRYL1290, EBERCRYL8200, EBERCRYL8200AE, EBERCRYL4820, EBERCRYL4858, EBERCRYL5129, EBERCRYL8210, EBERCRYL8254, EBERCRYL8301R, EBERCRYL8307, EBERCRYL8402, EBERCRYL8405, EBERCRYL8411, EBERCRYL8465, EBERCRYL8800, EBERCRYL8804, EBERCRYL8807, EBERCRYL9260, EBERCRYL9270, KRM7735, KRM8296, KRM8452, KRM8904, EBERCRYL8311, EBERCRYL8701, EBERCRYL9227EA, KRM8667, and KRM8528 manufactured by DAICEL-ALLNEX LTD.

Examples of commercially available products of other (meth)acrylates include 4HBA and 2HEA manufactured by Nippon Kasei Chemical Co., Ltd., and VISCOAT #802 (TriPEA), VISCOAT #295 (TMPTA), VISCOAT #300 (PETA), and VISCOAT #360 (TMPTEOA) manufactured by Osaka Organic Chemical Industry Ltd.

Examples of commercially available products of other ultraviolet curable monomers include HEVE, HBVE, DEGV, and EHVE manufactured by MARUZEN PETROCHEMICAL CO., LTD. These are monomers having a vinyl group.

(Polymerization Initiator)

As the polymerization initiator, a photopolymerization initiator is preferably used.

Examples of the photopolymerization initiator include vicinal polyketaldonyl compounds described in U.S. Pat. No. 2,367,660A, acyloin ether compounds described in U.S. Pat. No. 2,448,828A, aromatic acyloin compounds substituted with α-hydrocarbon described in U.S. Pat. No. 2,722,512A, polynuclear quinone compounds described in U.S. Pat. Nos. 3,046,127A and 2,951,758A, combinations of trially imidazole dimer and p-amino ketone described in U.S. Pat. No. 3,549,367A, benzothiazole compounds and trihalomethyl-s-triazine compounds described in JP1976-48516B (JP-S51-48516B), trihalomethyl-triazine compounds described in U.S. Pat. No. 4,239,850A, and trihalomethyl oxadiazole compounds described in U.S. Pat. No. 4,212,976A. Particularly, trihalomethyl-s-triazine, trihalomethyl oxadiazole, and triaryl imidazole dimer are preferable.

In addition to the above photopolymerization initiators, a suitable example includes a "polymerization initiator C" described in JP1999-133600A (JP-H11-133600A).

In addition, the amount of the polymerization initiator is preferably 0.01% to 20% by mass of the solid content of the polymerizable composition for forming a thermoplastic welded layer and more preferably 0.2% to 10% by mass.

(Solvent)

Examples of the solvent include amides (for example, N,N-dimethylformamide), sulfoxides (for example, dimethyl sulfoxide), heterocyclic compounds (for example, pyridine), hydrocarbons (for example, benzene, hexane, cyclohexane, and toluene), alkyl halides (for example, chloroform and dichloromethane), esters (for example, methyl acetate and butyl acetate), ketones (for example, acetone, methyl ethyl ketone, methyl isobutyl ketone, and cyclohexanone), ethers (for example, tetrahydrofuran and 1,2-dimethoxyethane), and alkyl alcohols (for example, methanol, ethanol, and propanol). In addition, two or more solvents may be used in a mixture. Among these, alkyl halides, esters, ketones, and a mixed solvent thereof are preferable.

[Block Layer]

In the present specification, the block layer is a layer provided between the thermoplastic welded layer and the liquid crystal layer. The movement of contained components of each of the thermoplastic welded layer and the liquid crystal layer is reduced, and preferably is eliminated, so that the respective functions of the thermoplastic welded layer and the liquid crystal layer can be maintained. Particularly, it is possible to maintain optical properties as designed in the liquid crystal layer.

The block layer in the transfer sheet includes a (meth) acrylate polymer.

As the (meth)acrylate polymer, the same compounds as those exemplified as the ultraviolet curable monomer can be used. That is, as the (meth)acrylate polymer included in the block layer, polymers obtained by polymerizing or polymerizing and crosslinking the (meth)acrylates exemplified in the above description as the ultraviolet curable monomer can be used. The (meth)acrylate polymer included in the block layer is preferably a polymer using the same (meth)acrylate monomer as the ultraviolet curable resin included in the thermoplastic welded layer as a raw material. That is, the (meth)acrylate polymer included in the block layer and the ultraviolet curable resin included in the thermoplastic welded layer are preferably the same (meth)acrylate polymer.

Although the film thickness of the block layer in the transfer sheet of the present invention is not particularly limited, the film thickness of the block layer is preferably 1 μm to 30 μm, more preferably 2 μm to 10 μm, and even more preferably 3 μm to 7 μm.

The (meth)acrylate polymer included in the block layer may be a polymer obtained by thermally or optically polymerizing (meth)acrylate but is particularly preferably a polymer obtained by optically polymerizing (meth)acrylate. A photopolymerization reaction may be performed after a composition for forming a block layer including (meth) acrylate is layered. For example, the composition for forming a block layer including (meth)acrylate may be directly applied to a layer such as a liquid crystal layer and the coating layer may be irradiated with ultraviolet rays. Regarding the application and ultraviolet irradiation of the composition for forming a block layer, the description related to the preparation of the thermoplastic welded layer in a method for producing the transfer sheet described later can be referred to.

The composition for forming a block layer may include components other than the (meth)acrylate, such as a polymerization initiator and an alignment agent. In addition, the composition may include a solvent. As the polymerization initiator and the solvent, those the same as the polymerization initiators and the solvents exemplified above in the composition for forming a thermoplastic welded layer can be used.

(Alignment Agent)

The alignment agent has a function of lowering the surface tension of a block layer coating film in a case where the block layer is formed by coating. Due to this effect, in a case where foreign substances in the air are mixed during the step of forming the block layer, the surface of a transfer body can be kept flat by preventing the foreign substances from appearing on the block layer surface. As a result, it is possible to obtain a transfer body having a good surface state.

The alignment agent is not particularly limited as long as the alignment agent has the above-described effect. However, a fluorine-based alignment agent is preferable and a fluorine-based alignment agent having a perfluoroalkyl group at a terminal is particularly preferable. Examples of the alignment agent include alignment agents described in JP2012-211306A or JP2005-99248A.

[Liquid Crystal Layer (Layer Formed by Curing Liquid Crystal Composition, Cured Liquid Crystal Composition Layer)]

The liquid crystal composition is a composition including a liquid crystal compound. The liquid crystal layer is obtained by aligning a liquid crystal compound in a liquid crystal state, then curing the liquid crystal compound, and fixing the alignment. The liquid crystal layer can have optical properties derived from properties of the liquid crystal compound and functioning as a phase difference layer, a selective reflection layer, or the like. In the present specification, the liquid crystal layer is a layer formed by fixing the liquid crystal compound through polymerization or the like, and after the liquid crystal layer is formed, the liquid crystal compound does not necessarily exhibit liquid crystallinity any more. The liquid crystal layer can be formed by conducting a curing reaction of a liquid crystal composition including a polymerizable liquid crystal compound which is applied onto a support or the like. The liquid crystal composition may further include a polymerization initiator, a chiral agent, alignment controlling agent, a crosslinking agent, and the like.

Regarding each component in the liquid crystal composition or the method for preparing the liquid crystal layer, the related arts can be referred to. For example, paragraphs 0036 to 0072 of WO2014/148408, paragraphs 0024 to 0062 of JP2012-181359A, paragraphs 0018 to 0048 of WO2015/050256, WO2015/115390, WO2015/147243, and the like can be referred to.

The liquid crystal layer is preferably a layer in which a cholesteric liquid crystalline phase described in JP2012-181359A, WO2015/050256, WO2015/115390, WO2015/147243, or the like is fixed.

The film thickness of the liquid crystal layer in the transfer sheet of the present invention is not particularly limited but is preferably 1 μm to 30 μm, more preferably 1 μm to 15 μm, and even more preferably 2 μm to 12 μm.

[Support or Alignment Layer]

Regarding the support or alignment layer for forming the liquid crystal layer, the related arts can be referred to. For example, the descriptions related to the above documents can be referred to. The support may be peeled off after the liquid crystal layer is formed and may not be included in the transfer sheet. In addition, the support may be included in the transfer sheet and may be peeled off during or after transfer. In a case where the support is peeled off, the alignment layer may be peeled off together with the support or may not be peeled off.

[Protective Layer]

The transfer sheet of the present invention may include a protective layer. The protective layer can be provided for protecting the sheet surface. For example, the transfer sheet includes the protective layer on the outermost layer which is a surface of the thermoplastic welded layer and the protective layer may be peeled off when being used as a transfer sheet.

<Method for Producing Transfer Sheet>

The transfer sheet can be produced by a production method including forming a thermoplastic welded layer including a thermoplastic resin and an ultraviolet curable monomer on a surface of the block layer of a material including the liquid crystal layer and the block layer, and irradiating the thermoplastic welded layer with ultraviolet rays. The thermoplastic welded layer before ultraviolet irradiation may or may not include an ultraviolet curable resin and it is sufficient that the thermoplastic welded layer includes an ultraviolet curable monomer which becomes an ultraviolet curable resin by polymerization. In the present specification, a layer before ultraviolet irradiation is sometimes particularly referred to as a thermoplastic welded layer before ultraviolet irradiation and a layer including an ultraviolet curable resin after ultraviolet irradiation is referred to as a thermoplastic welded layer after ultraviolet irradiation or is also simply referred to as a thermoplastic welded layer. That is, the thermoplastic welded layer before ultraviolet irradiation includes a thermoplastic resin and an ultraviolet curable monomer and an ultraviolet curable resin depending on cases. In a case where the thermoplastic welded layer before ultraviolet irradiation includes an ultraviolet curable resin, the ultraviolet curable resin is not particularly limited but compositions obtained by polymerizing the compounds exemplified in the above-described description of the ultraviolet curable monomer by ultraviolet irradiation in advance or polymerizing and crosslinking the compounds are preferably used. The thermoplastic welded layer after ultraviolet irradiation includes a thermoplastic resin and an ultraviolet curable resin. The content of the ultraviolet curable resin included in the thermoplastic welded layer after ultraviolet irradiation is as described in the above-described description of the thermoplastic welded layer.

The material including the liquid crystal layer and the block layer can be obtained by forming the block layer on the liquid crystal layer or using the block layer as a support and forming the liquid crystal layer on the support. Among these, it is preferable to form the block layer on the liquid crystal layer.

The thermoplastic welded layer is formed on the surface of the block layer. Accordingly, it is possible to obtain a transfer sheet in which the block layer and the thermoplastic welded layer are in direct contact with each other. The thermoplastic welded layer can be formed by applying the composition for forming a thermoplastic welded layer to the surface of the block layer or using a sheet-like thermoplastic welded layer. In the formation of the thermoplastic welded layer using a sheet-like thermoplastic welded layer, the sheet-like thermoplastic welded layer can be prepared by forming a thermoplastic welded layer on a release sheet in the same manner as described above. Thereafter, the release sheet is laminated such that the thermoplastic welded layer is brought into contact with the block layer. The release sheet may be peeled off after lamination and before ultraviolet irradiation or may be peeled off after ultraviolet irradiation. It is preferable that the release sheet is peeled off after ultraviolet irradiation. This is because the release sheet can be peeled off after the adhesiveness between the thermoplastic welded layer and the block layer is secured.

In addition to the application of the composition for forming a thermoplastic welded layer, coating in the present specification can be performed by a coating method, for example, a dip coating method, an air knife method, a spin coating method, a slit coating method, a curtain coating method, a roller coating method, a wire bar coating method, a gravure coating method, or an extrusion coating method (described in U.S. Pat. No. 2,681,294A). Two or more layers may be applied simultaneously. Methods for simultaneous coating are described in each of U.S. Pat. Nos. 2,761,791A, 2,941,898A, 3,508,947A, and 3,526,528A and Yuji Harazaki, "Coating Engineering," p 253, Asakura Publishing Co., Ltd. (1973).

The thermoplastic welded layer before ultraviolet irradiation including the thermoplastic resin and the ultraviolet curable monomer, which has been formed as described above, is irradiated with ultraviolet rays. The irradiation energy of the ultraviolet irradiation is preferably 10 mJ/cm$^2$ to 10 J/cm$^2$ and more preferably 25 to 1,000 mJ/cm$^2$. The illuminance is preferably 10 to 2,000 mW/cm$^2$, more preferably 20 to 1,500 mW/cm$^2$, and even more preferably 100 to 1,000 mW/cm$^2$. The irradiation wavelength preferably has a peak at 280 to 1,000 nm and more preferably has a peak at 340 to 800 nm. In order to promote the photopolymerization reaction, light irradiation may be performed in an inert gas atmosphere such as nitrogen or under a heating condition.

By performing the ultraviolet irradiation, the ultraviolet curable monomer becomes an ultraviolet curable resin through polymerization and the adhesiveness with the block layer is improved. It is preferable that the ultraviolet irradiation is performed such that the amount of the ultraviolet curable monomer with respect to the total mass of the ultraviolet curable resin and the ultraviolet curable monomer in the thermoplastic welded layer as described above is within the above range.

<Use of Transfer Sheet>

The transfer sheet of the present invention can be used as a sheet for transferring the liquid crystal layer to a base material using heat sealing by the thermoplastic welded layer.

The base material is not particularly limited but a metal or plastic may be used. The base material is preferably formed of a plastic. Preferable examples of the plastic include polycarbonate and acrylic resins, and polycarbonate is preferable. The base material may be a sheet-like substrate or may be a molded article having a curved surface or an uneven portion. The base material may already have the shape of the base material or a molded article (for example, a substrate) at the time of heating of heat sealing or may have the shape of the base material or a molded article simultaneously with heating of heat sealing. In addition, the base material may already have the shape of the base material or a molded article (for example, a substrate) when the base material is made to face the thermoplastic welded layer or may have the shape of the base material or a molded article simultaneously when the base material is made to face the thermoplastic welded layer by injection molding or the like.

For example, the transfer sheet of the present invention can be bonded to the base material by performing heating in a state in which the thermoplastic welded layer is allowed to face and be in contact with the base material. In a case of performing heating for the bonding, generally, any method known for heat sealing may be used.

The transfer sheet of the present invention can be used as a raw material film in a case where a molded article having a liquid crystal layer through a step including heating and pressurization is produced.

In a case where the transfer sheet is used as a raw material film produced through a step including heating and pressurization, the tensile elongation of the transfer sheet of the present invention is preferably 5% to 40%, more preferably 10% to 30%, and even more preferably 12% to 25%. The tensile elongation can be measured according to a thin plastic sheet tensile test (ASTM D882).

As a method for producing a molded article having a liquid crystal layer through a step including heating and pressurization by using the transfer sheet of the present invention, for example, methods using vacuum molding, air pressure molding, matched die molding, and insert molding may be used.

For example, the vacuum molding, air pressure molding, and matched die molding are molding in which a flat plate of resin or metal is pressurized with a mold or compressed air while being heated to form a desired shape. The thermoplastic welded layer of the transfer sheet of the present invention is made to face the flat plate in advance and pressurized while being heated, so that the liquid crystal layer can be provided in a processed product formed from the flat plate through the thermoplastic resin and the block layer.

The insert molding is molding capable of obtaining a resin molded article having a surface to which a plastic film is laminated or transferred by after inserting the plastic film into a mold of an injection molding machine, injecting a resin into the mold of the injection molding machine and performing heating and compression. In a case of using the transfer sheet of the present invention, it is possible to obtain a molded article having a liquid crystal layer by inserting the transfer sheet of the present invention into the mold of the injection molding machine such that the thermoplastic welded layer is disposed on a side close to the resin to be injected. As the resin to be injected, an acrylic resin or polycarbonate is preferable. For example, as a polycarbonate resin, NOVAREX 7022-1 (manufactured by Mitsubishi Engineering Plastics Co., Ltd.) can be used.

<Optical Laminate>

As the molded article that can be produced using the transfer sheet of the present invention, an optical laminate may be mentioned. The optical laminate can be obtained by forming a base material on the surface of the thermoplastic welded layer of the transfer sheet under a heating condition. The optical laminate includes the base material, the thermoplastic welded layer, the block layer, and the liquid crystal layer in this order. The optical laminate includes the transfer sheet and the base material and the base material and the thermoplastic welded layer are preferably in direct contact with each other. The base material preferably includes polycarbonate. In addition, it is preferable that a method for producing an optical laminate includes applying a composition including a thermoplastic resin and an ultraviolet curable monomer on a surface of the block layer of a material including the liquid crystal layer and the block layer and irradiating the coating layer with ultraviolet rays. Regarding the irradiation of the coating layer with ultraviolet rays, the description of ultraviolet irradiation in the above-described method for producing a transfer sheet can be referred to.

According to optical properties of the liquid crystal layer, optical laminates for various uses can be produced. Examples of the optical laminate include a phase difference film, a reflection film, an antireflection film, a filter for a sensor, a half mirror, a heat barrier sheet, a heat barrier film (such as an UV-cut sheet), a decorative sheet, a circular polarizing filter, a light scattering sheet, and a reflective type screen.

EXAMPLES

The present invention will be described in more detail with reference to Examples below. Note that the materials, reagents, amounts and ratios of substances, operations, and the like shown in Examples below can be appropriately modified without departing from the spirit of the present invention. The scope of the present invention is, therefore, not limited to Examples below.

Example 1

<Preparation of Liquid Crystal Layer>

A coating solution for forming a liquid crystal layer having the following composition was prepared.

(Composition of Coating Solution for Forming Liquid Crystal Layer)

Polymerizable cholesteric liquid crystal compound A . . . 95 parts by mass
Chiral agent B . . . 4.5 parts by mass
Monofunctional monomer C . . . 5 parts by mass
Methyl ethyl ketone . . . 172 parts by mass
Cyclohexanone . . . 19 parts by mass
Polymerization initiator E . . . 4 parts by mass
Alignment controlling agent F . . . 0.1 parts by mass (Polymerizable Cholesteric Liquid Crystal Compound A)
Product name: RM-257, Available from: Merck KGaA

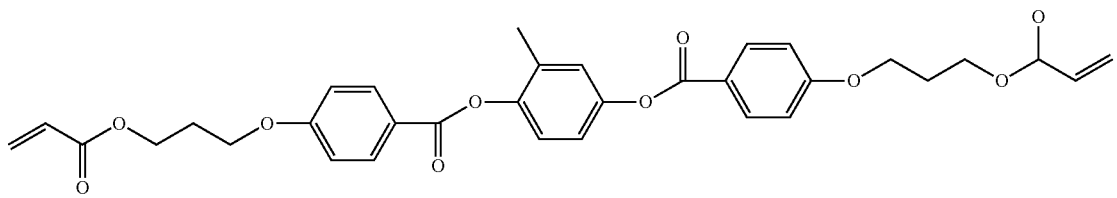

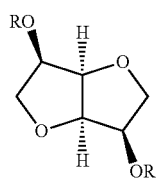 R = 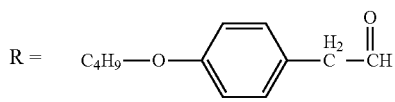

(Chiral Agent B)

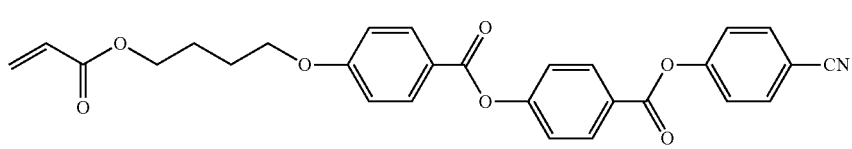

(Monofunctional Monomer C)

(Polymerization Initiator E)
Product name: IRGACURE 819, Available from: BASF SE
(Alignment Controlling Agent F)
Compound described in JP2005-99248A

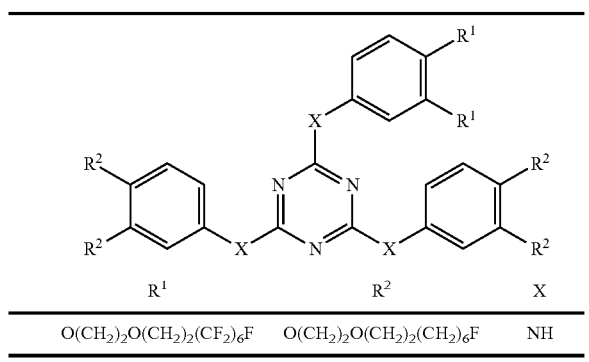

| $R^1$ | $R^2$ | X |
|---|---|---|
| $O(CH_2)_2O(CH_2)_2(CF_2)_6F$ | $O(CH_2)_2O(CH_2)_2(CH_2)_6F$ | NH |

The coating solution for forming a liquid crystal layer was applied to a PET film with a thickness of 50 μm manufactured by Fujifilm corporation at room temperature using a wire bar such that the thickness of the dried film after drying was about 4 to 5 μm. The coating film was dried for 30 seconds at 30° C. and then heated for 2 minutes in an atmosphere at 100° C. to obtain a cholesteric liquid crystalline phase. Then, UV irradiation was performed for 3 seconds by adjusting the output with a metal halide lamp (manufactured by Eyegraphics Co., Ltd.) at 30° C. under an atmosphere purged with nitrogen with an illuminance of 28.3 mW/cm² and the cholesteric liquid crystalline phase was fixed to prepare a liquid crystal layer.

<Preparation of Block Layer>

A coating solution for forming a block layer having the following composition was prepared.

(Composition of Coating Solution for Forming Block Layer)

Urethane acrylate monomer U-10HA (manufactured by Shin-Nakamura Chemical Co., Ltd.) . . . 2.9 parts by mass
Alignment agent 1 . . . 0.02 parts by mass
Polymerization initiator (OXE01) (manufactured by BASF SE) . . . 0.08 parts by mass
Methyl ethyl ketone . . . 7 parts by mass Alignment agent 1

$C_6F_{13}H_2CO$—[structure]—$OCH_2C_6F_{13}$

The alignment agent 1 was synthesized using the method described in Synthesis Example 1 of JP2012-211306A.

The coating solution for forming a block layer was applied to the surface of the liquid crystal layer at room temperature using a wire bar such that the thickness of the dried film after drying was 5 μm. After the coating layer was dried for 10 seconds at room temperature, the layer was heated for 1 minute in an atmosphere at 85° C. and then irradiated with ultraviolet rays from a D bulb (lamp 90 mW/cm) manufactured by Heraeus Nobleight Fusion UV K.K., at 70° C. at an output of 80% for 5 seconds.

In the above procedure, a material having the liquid crystal layer and the block layer on the PET film was obtained.

<Preparation of Thermoplastic Welded Layer>

A coating solution for forming a thermoplastic welded layer having the following composition was prepared.

(Composition of Coating Solution for Forming Thermoplastic Welded Layer)

Vinyl chloride resin/methyl ethyl ketone/toluene solution•200 CG (manufactured by DIC Corporation) (concentration of vinyl chloride resin: 20% by mass) . . . 50 parts by mass Methyl ethyl ketone . . . 50 parts by mass Urethane acrylate monomer U-4HA (manufactured by Shin-Nakamura Chemical Co., Ltd.) . . . 10 parts by mass Polymerization initiator (OXE01) (manufactured by BASF SE) . . . 0.08 parts by mass The coating solution for forming a thermoplastic welded layer was applied to the block layer of the material at room temperature using a wire bar such that the thickness of the dried film after drying was 1 μm. After the coating layer was dried for 10 seconds at room temperature, the layer was heated for 1 minute in an atmosphere at 85° C. and then irradiated with ultraviolet rays from a D bulb (lamp 90 mW/cm) manufactured by Heraeus Nobleight Fusion UV K.K., at 70° C. at an output of 80% for 5 seconds. In the above procedure, a transfer sheet having the liquid crystal layer, the block layer, and the thermoplastic welded layer on the PET film was obtained.

The degree of non-polymerization of the urethane acrylate monomer U-4HA of the thermoplastic welded layer of the transfer sheet was 48%. The degree of polymerization was obtained by measuring the absorbance of absorption at 1,647 to 1,640 cm$^{-1}$ observed with a Fourier transform infrared spectrophotometer (IRAffinity-1S (manufactured by Shimadzu Corporation)) with respect to the thermoplastic welded layer before and after ultraviolet irradiation and calculating the obtained values from the following expression.

(Absorbance of thermoplastic welded layer after ultraviolet irradiation)/(Absorbance of thermoplastic welded layer before ultraviolet irradiation)×100%

<Preparation of Optical Laminate>

The PET substrate of the transfer sheet was arranged on a bottom surface of a recessed portion of a first mold (recess mold) of an injection mold combination of the first mold (recess mold) and a second mold (projection mold) for preparing a flat plate such that the PET substrate of the transfer sheet was disposed on the bottom surface side. The first and second molds were closed and combined to form a cavity. Molten polycarbonate pellets (NOVAREX 7022-1 (manufactured by Mitsubishi Engineering Plastics Co., Ltd.)) was injected into the formed cavity and molded (mold temperature: 120° C., resin temperature: 120° C., pressure: 88.2 MPa (900 kg/cm$^2$), time: 15 seconds). After cooling, the mold was opened and the PET film was peeled off from the obtained molded body. Thus, an optical laminate of Example 1 having the thermoplastic welded layer, the block layer, and the liquid crystal layer on the polycarbonate substrate was obtained.

Example 2

An optical laminate of Example 2 was prepared in the same procedure as in Example 1 except that in the coating solution for forming a thermoplastic welded layer, the amount of the urethane acrylate monomer U-4HA was changed to 5 parts by mass.

Example 3

An optical laminate of Example 3 was prepared in the same procedure as in Example 1 except that in the coating solution for forming a thermoplastic welded layer, the urethane acrylate monomer U-4HA was changed to a urethane acrylate monomer U-10HA (manufactured by Shin-Nakamura Chemical Co., Ltd.).

Example 4

An optical laminate of Example 4 was prepared in the same procedure as in Example 1 except that the film thickness of the thermoplastic welded layer after drying was set to 2 μm.

Example 5

An optical laminate of Example 5 was obtained in the same procedure as in Example 1 except that at the time of preparation of the thermoplastic welded layer, the temperature at UV irradiation was set to 85° C. As a result of checking the degree of non-polymerization of the urethane acrylate monomer U-4HA of the thermoplastic welded layer of the transfer sheet in the same procedure as in Example 1, the degree of non-polymerization was 19%.

Example 6

An optical laminate of Example 6 was prepared in the same procedure as in Example 1 except that in the coating solution for forming a thermoplastic welded layer, instead of using the vinyl chloride resin/methyl ethyl ketone/toluene solution•200 CG (manufactured by DIC Corporation), a vinyl chloride resin/methyl ethyl ketone/toluene solution•5 G (manufactured by DIC Corporation) was used.

Comparative Example 1

An optical laminate of Comparative Example 1 was prepared in the same procedure as in Example 1 except that in the coating solution for forming a thermoplastic welded layer, the urethane acrylate U-4HA was not added.

Comparative Example 2

An optical laminate of Comparative Example 2 was prepared in the same procedure as in Example 1 except that in the coating solution for forming a thermoplastic welded layer, instead of using the vinyl chloride resin/methyl ethyl ketone/toluene solution•200 CG (manufactured by DIC Corporation), a vinyl chloride resin/methyl ethyl ketone/toluene solution•5 G (manufactured by DIC Corporation) was used, and the urethane acrylate U-4HA was not used.

<Evaluation of Optical Laminate>

(Evaluation of Adhesiveness)

The surface of each of the obtained optical laminates on the liquid crystal layer side was subjected to a cross cut test determined according to JIS K 5600-56 and the results were classified into grades of 6 stages from 0 to 5 determined according to JIS K 5600-56 for evaluation. The results are shown in Table 1.

(Measurement of Haze Value)

The haze value of each of the obtained optical laminates was measured using a haze meter (manufactured by Murakami Color Research Laboratory Co., Ltd.).

TABLE 1

| | Composition of thermoplastic welded layer (before ultraviolet irradiation) | | | Degree of non-polymerization of urethane acrylate monomer | Film thickness of thermoplastic welded layer | Cross cut grade | Haze value |
|---|---|---|---|---|---|---|---|
| | Vinyl chloride resin | Urethane acrylate monomer | Content of urethane acrylate monomer | | | | |
| Example 1 | 200 CG | U-4HA | 10 parts by mass | 48% | 1 μm | 0 | 2.5% |
| Example 2 | 200 CG | U-4HA | 5 parts by mass | 43% | 1 μm | 0 | 2.4% |
| Example 3 | 200 CG | U-10HA | 10 parts by mass | 47% | 1 μm | 0 | 2.4% |
| Example 4 | 200 CG | U-4HA | 10 parts by mass | 47% | 2 μm | 0 | 2.5% |
| Example 5 | 200 CG | U-4HA | 10 parts by mass | 19% | 1 μm | 0 | 2.5% |
| Example 6 | 5 G | U-4HA | 10 parts by mass | 48% | 1 μm | 0 | 2.5% |
| Comparative Example 1 | 200 CG | Not added | — | — | 1 μm | 3 | 2.5% |
| Comparative Example 2 | 5 G | Not added | — | — | 1 μm | 3 | 2.4% |

In Examples 1 to 6, a grade 0 for showing that all squares of the lattice of the cross cut were not peeled off was obtained. In Comparative Examples 1 and 2, partial or entire peeling occurred along the cross cut line and the respective grades were 3. In Comparative Examples 1 and 2, peeling occurred. The component analysis for the surface of the polycarbonate substrate at the peeled-off portion was performed with ESCA (ESCA-1000 manufactured by Shimadzu Corporation). As a result, the same component as in the thermoplastic welded layer was detected. In addition, the film of the peeled-off portion on the liquid crystal layer side had a film thickness equal to the total thickness of the block layer and the liquid crystal layer. Therefore, it was found that the peeling occurred between thermoplastic welded layer and the block layer.

From the obtained results, it was found that in the optical laminate prepared using the transfer sheet having the thermoplastic welded layer and formed from the coating solution including the ultraviolet curable monomer, the adhesiveness between the layers was improved.

In addition, it was found that in the optical laminate prepared using the transfer sheet having the thermoplastic welded layer and formed from the coating solution including the ultraviolet curable monomer, the haze value was 3% or less and the optical properties were not damaged by injection molding.

What is claimed is:
1. A transfer sheet comprising, in order:
a cured liquid crystal composition layer;
a block layer; and
a thermoplastic welded layer,
wherein the block layer includes a urethane (meth)acrylate polymer,
the thermoplastic welded layer and the block layer are in direct contact with each other, and
the thermoplastic welded layer includes a thermoplastic resin and an ultraviolet curable resin.
2. The transfer sheet according to claim 1,
wherein a content of the ultraviolet curable resin in the thermoplastic welded layer is 100% by mass or less with respect to a mass of the thermoplastic resin.
3. The transfer sheet according to claim 1,
wherein the ultraviolet curable resin and the urethane (meth)acrylate polymer included in the block layer are the same urethane (meth)acrylate polymer.
4. The transfer sheet according to claim 1,
wherein a film thickness of the thermoplastic welded layer is 0.5 μm to 30 μm.
5. The transfer sheet according to claim 1,
wherein the thermoplastic welded layer includes an ultraviolet curable monomer, and
a content of the ultraviolet curable monomer is 50% by mass or less with respect to a total mass of the ultraviolet curable resin and the ultraviolet curable monomer.
6. The transfer sheet according to claim 5,
wherein the content of the ultraviolet curable monomer is 20% by mass or less with respect to the total mass of the ultraviolet curable resin and the ultraviolet curable monomer.
7. An optical laminate comprising:
the transfer sheet according to claim 1; and
a base material,
wherein the base material and the thermoplastic welded layer are in direct contact with each other.
8. The optical laminate according to claim 7,
wherein the base material includes polycarbonate.
9. A method for producing an optical laminate comprising:
forming a base material on a surface of the thermoplastic welded layer of the transfer sheet according to claim 1 under a heating condition,
wherein the optical laminate includes the cured liquid crystal composition layer, the block layer, the thermoplastic welded layer, and the base material in this order.
10. The method for producing an optical laminate according to claim 9, further comprising:
applying a composition including a thermoplastic resin and an ultraviolet curable monomer to a surface of the block layer of a material including the cured liquid crystal composition layer and the block layer; and
irradiating a coating layer obtained after the applying of the composition with ultraviolet rays.
11. A method for producing the transfer sheet according to claim 1 comprising:
forming a thermoplastic welded layer including a thermoplastic resin and an ultraviolet curable monomer on a surface of the block layer of a material including the cured liquid crystal composition layer and the block layer; and
irradiating the thermoplastic welded layer with ultraviolet rays.

* * * * *